(12) United States Patent
Muralidhar et al.

(10) Patent No.: US 7,200,757 B1
(45) Date of Patent: Apr. 3, 2007

(54) DATA SHUFFLING PROCEDURE FOR MASKING DATA

(75) Inventors: Krishnamurty Muralidhar, Lexington, KY (US); Rathindra Sarathy, Stillwater, OK (US)

(73) Assignee: University of Kentucky Research Foundation, Lexington, KY (US)

( * ) Notice: Subject to any disclaimer, the term of this patent is extended or adjusted under 35 U.S.C. 154(b) by 774 days.

(21) Appl. No.: 10/437,315

(22) Filed: May 13, 2003

Related U.S. Application Data (60) Provisional application No. 60/380,245, filed on May 13, 2002.

(51) Int. Cl.
G06F 11/30 (2006.01)
G06F 17/30 (2006.01)

(52) U.S. Cl. .......................... 713/189; 713/193; 707/4; 707/200

(58) Field of Classification Search ................ 380/252, 380/210; 707/4, 200; 713/189, 193; 712/300
See application file for complete search history.

(56) References Cited

OTHER PUBLICATIONS

Security of Random Data Perturbation Methods, Muralidhar et al, pp. 487-493, ACM, 2000.*
A General Additive Data Perturbation Method for Database Security, Muralidhar et al, pp. 1399-1415, Management Sciences, 1999.*
Masking Microdata Files, Kim et al, pp. 114-119, US Bureau of Census, 1995.*
Controlled Data-swapping Techniques for Masking Public Use Microdata Sets, Moore, Jr., pp. 1-27, US Bureau Census, 1996.*
Producing Public-Use Microdata that Are Analytically valid and confidential, Winkler et al, pp. 41-50, US Bureau of census, 1997.*
Statistical Notions of Data Disclosure Avoidance and Their Relationship to Traditional Statistical Methodology: Data Swapping and Loglinear Models, Fienberg et al, Proceedings of Bureau of Census 1996 Annual Research.*

* cited by examiner

*Primary Examiner*—Nasser Moazzami
*Assistant Examiner*—Shanto M Z Abedine
(74) *Attorney, Agent, or Firm*—King & Schickli, PLLC

(57) ABSTRACT

A method for data shuffling to preserve data confidentiality is provided. The method comprises masking of particular attributes of a dataset which are to be preserved in confidentiality, followed by a shuffling step comprising sorting the transformed dataset and a transformed confidential attribute in accordance with the same rank order criteria. For normally distributed datasets, transformation may be achieved by general additive data perturbation, followed by generating a normalized perturbed value of the confidential attribute using a conditional distribution of the confidential and non-confidential attribute. In another aspect, a software program for accomplishing the method of the present invention is provided. The method of the invention provides greater security and utility for the data, and increases user comfort by allowing use of the actual data without identifying the origin.

21 Claims, 3 Drawing Sheets

DATA SHUFFLING PROCEDURE FOR MASKING DATA

This application claims the benefit of U.S. Provisional Patent Application Ser. No. 60/380,245, filed May 13, 2002.

TECHNICAL FIELD

The present invention relates to the art of masking data to prevent release of confidential portions thereof into the public domain. More particularly, the present invention relates to an improved method for use in masking data variables which are not to be released, wherein the masked data retains the same univariate characteristics, the same relationships between confidential variables, and the same relationships between confidential and non-confidential variables as in the original data set.

COPYRIGHTED MATERIALS

A portion of the disclosure of this patent document contains materials to which a claim of copyright protection is made. The copyright owner has no objection to the reproduction by anyone of the patent document or the patent disclosure as it appears in the U.S. Patent and Trademark Office patent files or records, but reserves all other rights with respect to the copyrighted work.

BACKGROUND OF THE INVENTION

Protecting numerical confidential data from disclosure is an important aspect of security. Such data was once the purview of data gathering and disseminating organizations, such as for example the U.S. Census Bureau. However, with recent advances in information technology, more organizations are storing extensive amounts of data for purposes of analysis using sophisticated tools and techniques. While such analyses are of tremendous value to organizations and individuals making use of the data, there is also risk that the analyses may result in disclosure of confidential information. Consequently, the need for protection of confidential data from disclosure, while still allowing dissemination of at least a portion thereof, has grown.

Disclosure to unauthorized users can be prevented by passwords, by firewalls, and the like. However, authorized users must be provided access to the data as part of their authorization, to allow making use thereof. There remains a risk that the authorized users will use their access to access the data for illegitimate purposes. Such users are often referred to as "snoopers" or "data spies." It is almost impossible to identify a user a priori as a snooper. The challenge is then to provide users with the requisite access to data to perform legitimate tasks, while still preventing access to confidential information. This creates problems in restricting access totally unlike the relatively straightforward task of preventing access by unauthorized users.

A variety of disclosure limitation techniques are known, and can be broadly classified as masking techniques and query restriction techniques. Masking techniques modify the original data. Users are provided either complete or restricted access to the masked data, and no access to the original data. Performance of masking data methods is evaluated based on the extent to which they satisfy the needs of the legitimate user while preventing disclosure of confidential information to snoopers. Disclosure may occur when the identity of an individual, the exact value of a confidential attribute, or both are disclosed as the result of a query. Disclosure may also occur when sufficient information is provided to allow a user to infer the identity of an individual, the exact value of a confidential attribute, or both with a greater degree of accuracy than possible without access to the data. In the strictest sense, disclosure may be said to have occurred if providing access to data allows the snooper to gain any knowledge regarding confidential information. Accordingly, an optimal disclosure limitation technique must provide legitimate users with unrestricted access to accurate data, while at the same time providing the user with no additional knowledge regarding any portion of the data deemed confidential.

Data masking techniques are known in the art. Of the most utilized conventional procedures, three of them (Perturbation, Imputation, and PRAM) rely on denying the user access to the "true" values of confidential attributes. The techniques either modify the true values (Perturbation and PRAM) or provide simulated or synthetic data in place of the true values (Imputation). These methods are generally effective for their intended purpose. However, acceptance by the user is a significant concern. Because the data provided to the user has been altered from its original form, the user may be more reluctant to accept the data, and to trust any result or analyses derived therefrom.

A fourth method of data masking, data swapping, provides the advantage that users are allowed access to the original, true values of the confidential attributes. Masking is achieved by exchanging the values of attributes between different records, whereby the given value of a confidential attribute does not necessarily belong to that record with which it is associated after swapping. The user is more easily able to understand the process, and acceptance of the data may be higher. Unfortunately, simple data swapping is primarily based on the concept of data tables, and does not directly address the issue of continuous, numerical confidential attributes. For such attributes, existing data swapping methods are primarily heuristic procedures. Data utility is poor, since all relationships between the variables are modified. Further, disclosure risk is high.

Accordingly, a need is identified for an improved method for data masking. The method should minimize disclosure risk, while maximizing user comfort with the data accessed. The method should produce masked data having the same characteristics as the original data, including the same univariate characteristics, the same relationships between confidential variable, and the same relationships between non-confidential variable. Access to the confidential variables should provide the user with no additional information, and minimize the risk of actual or inferential disclosure.

SUMMARY OF THE INVENTION

In accordance with a first aspect of the invention, a method for ensuring confidentiality of variables in a dataset having at least one confidential attribute (also referred to herein as a variable) is provided comprising separating the dataset into at least one non-masked confidential attribute and at least one non-confidential attribute, normalizing the dataset into a multivariate normal distribution, and calculating a masked confidential attribute comprising a normalized perturbed value for the confidential attribute derived from a conditional distribution of the confidential and non-confidential attribute. Next, is the step of creating a second, masked dataset comprising the masked confidential attribute, wherein a relationship of the masked confidential attribute to the non-confidential attribute is substantially the same as the relationship of the non-confidential attribute to the confidential attribute from which the masked confidential attribute was derived. The second dataset is then sorted by a predetermined parameter, followed by independently sorting the unmasked confidential attribute by the predetermined parameter. Finally, the sorted masked confidential attribute in the sorted second dataset is replaced with the sorted non-masked confidential attribute.

Each of the confidential and non-confidential attribute may be selected from the group consisting of numerical and categorical attributes, and any combination thereof. The normalized conditional distribution of the confidential and non-confidential attribute is calculated as $f(X^*|S^*)$, where $X^*$ is the normalized confidential attribute, $S^*$ is the normalized non-confidential attribute, and f is the marginal density of $X^*$ and $S^*$.

In one embodiment, if the dataset has a non-normal distribution, the dataset is normalized by transforming into a multivariate normal distribution using copula-based general additive data perturbation (GADP) prior to deriving the conditional distribution of the confidential and non-confidential attribute. In another embodiment, if the dataset has a normal distribution, the dataset is normalized by transforming into a multivariate normal distribution using GADP prior to deriving the conditional distribution of the confidential and non-confidential attribute.

Next is the step wherein the normalized perturbed value of the confidential attribute $Y_i$ is calculated as $f(X^*|S^*=s_i)$, where $Y_i$ is the normalized perturbed confidential attribute, X is the normalized confidential attribute, S is the normalized non-confidential attribute, f is the marginal density of $X^*$ and $S^*$, and $s_i$ is the value of the non-confidential attribute for the $i^{th}$ observation. The masked dataset and unmasked confidential attribute are then sorted by rank order. It will be appreciated that the masked dataset and unmasked confidential attribute should be sorted by the same criteria, such as in ascending order or in descending order.

In another aspect of the present invention, a computer software program for ensuring confidentiality of variables or attributes in a dataset having at least one confidential variable is provided, wherein the software performs the steps as described above.

In yet another aspect, the invention provides a method for ensuring confidentiality of variables in a dataset least one confidential variable or attribute, comprising selecting a masking procedure of choice, masking at least one confidential variable in the dataset to created a second dataset including the masked confidential variable, and rank ordering the second dataset. Next is the step of rank ordering the confidential variable using the same criteria as the rank ordering of the second dataset, followed by replacing the rank-ordered masked confidential variable with the rank-ordered confidential variable. The confidential variable may be masked by generating a normalized perturbed value thereof, and the second dataset and confidential variable may be rank-ordered in either ascending order or descending order.

DETAILED DESCRIPTION OF THE INVENTION

Figure 1:
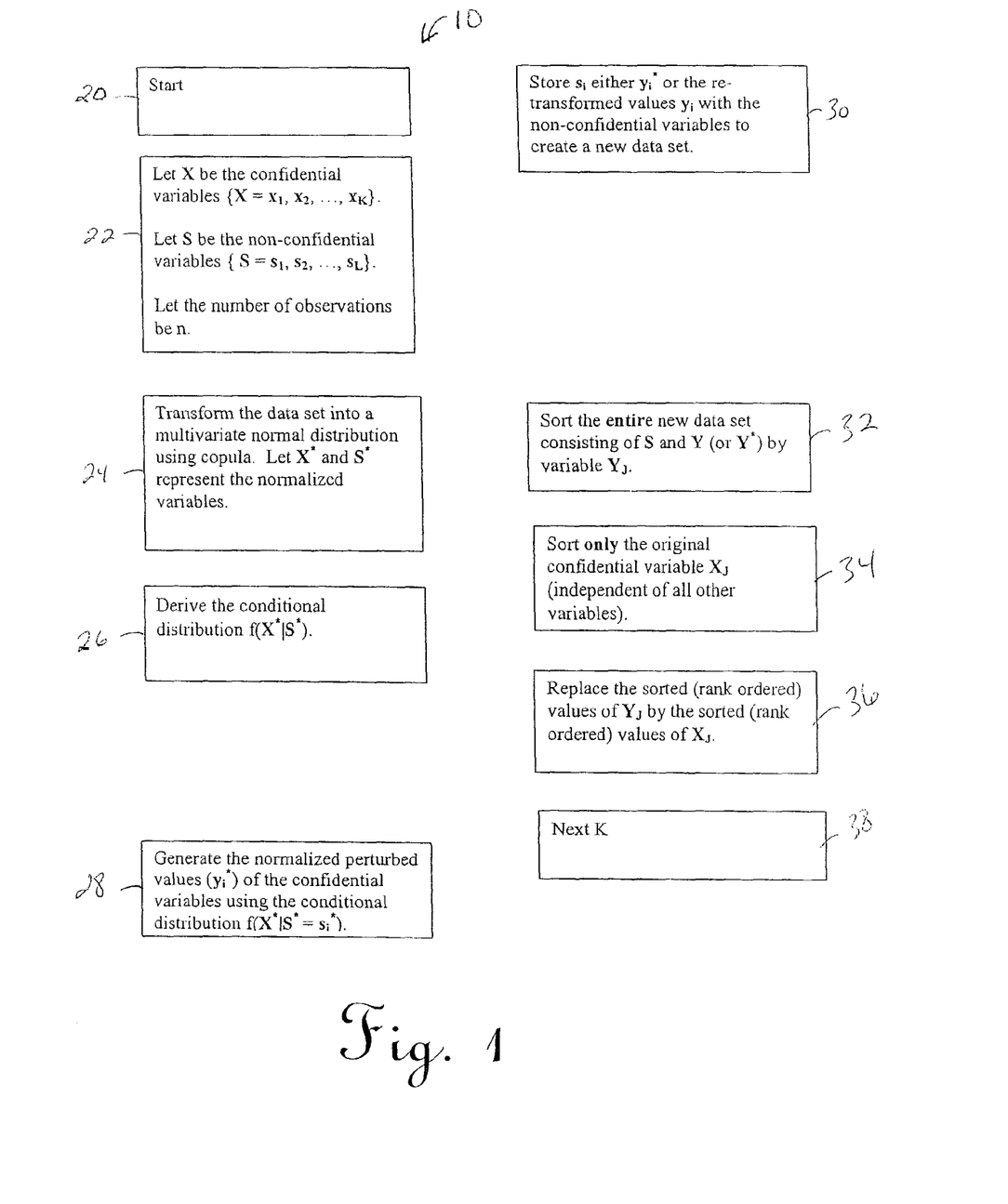
FIG. 1 is a flow chart of the method of the present invention for ensuring confidentiality of data in a dataset.

Reference is now made to FIG. 1, wherein is described a presently preferred embodiment of the present invention. The Figure describes a method 10 for ensuring data confidentiality, comprising a step 20 of selecting a database followed by the step 22 of selecting one or more attributes or variables X which are to be kept in confidentiality, and one or more attributes or variables S which are non-confidential. The confidential and non-confidential attributes X and S may be either numerical or categorical. Next, in step 24 the data set is transformed into a multivariate normal distribution. In the case of a dataset having a non-normal distribution, in step 24 the transformation may be done by copula-based general additive data perturbation (GADP) (Sarathy et al., 2002, Perturbing Normormal Confidential Attributes: The Copula Approach, Management Science 48: 1613–1627, incorporated herein by reference in its entirety). The confidential and non-confidential attributes can be considered as a realization of values resulting from deriving the conditional distribution thereof in accordance with the formula $f(X^*|S^*)$ as shown in step 26, where $X^*$ is the normalized confidential attribute, $S^*$ is the normalized non-confidential attribute, and f is the marginal density of $X^*$ and $S^*$.

Next, in step 28 for each value of S as given, the actual values of the $i^{th}$ observation $X_i$ is masked by calculating as a realization $y_i$ from the conditional distribution of $f(X^*|S^*=s_i)$, where $y_i$ is the normalized perturbed confidential attribute, $X^*$ is the normalized confidential attribute, $S^*$ is the normalized non-confidential attribute, f is the marginal density of $X^*$ and $S^*$, and $s_i$ is the value of the non-confidential attribute for the $i^{th}$ observation. This process is repeated for every observation i, and the normalized $y_i^*$ or the retransformed $y_i$ are matched with the non-confidential variables or attributes to create a second, masked dataset (Step 30).

It will be appreciated that masking the confidential attributes in this manner satisfies the requirements for security and lack of bias for the dataset. The bias requirement states that the distribution of the collection of values $Y_i$ (Y) should have the same characteristics as X, and should have the same relationship with S as X has with S. In other words, it is necessary that: $f(Y)=f(X)$ and $f(Y,S)=f(X,S)$. Since $y_i=f(X|S=s_i)$, then $f(Y|S)=f(X|S)$. Further, $f(Y,S)=f(X|S)*f(s)=f(X,S)$. In addition, $f(Y)=\int f(Y,S)ds=\int f(X,S)ds=f(X)$. These calculations show that if the values $y_i$ are generated from the conditional distribution $f(X|S=s_i)$, then the resulting masked values satisfy the unbiased requirement for masked data. In addition, the conditional independence value also implies that for a given value $S=s_i$, the values of $y_i$ are independent of the values $x_i$. Expressed formulaically: $f(X, Y|S=s_i)=f(X|S=s_i)f(Y|S=s_i)$.

The predictive ability of a snooper is determined by the conditional distribution of X. When the snooper only has information about S, the predictive ability of the snooper is based on $f(X|S)$. When the snooper has additional information in the form of masked values, the predictive ability of the snooper is based on $f(X|S,Y)$. However, $f(X|S,Y)=f(XY|S)/f(Y|S)=f(X|S)f(Y|S)/f(Y|S)=f(X|S)$. Thus, providing users access to the individual microdata values of Y provides snoopers with no additional information regarding the confidential attributes X. Hence, generating the masked values using the conditional distribution f(X|S) provides optimal results since the characteristics of the original database and the released database are the same. The snooper does not gain additional information regarding the confidential attributes when access to the masked data is provided, and finally, complete access to the microdata can be provided.

In the special case where all the attributes are to be masked (S is null) or if there is no relationship between the confidential and non-confidential attributes, then the conditional distribution f(X|S) reduces to f(X) and generating an independent set of values from the conditional distribution of X directly will provide the appropriate masked values.

It is important to note that the derivations described above are suited to both numerical and categorical attributes. In order to derive the conditional distribution of X|S, it is first necessary to describe the joint distribution of X and S, the distribution of S, and derive the conditional distribution using both. If the joint distribution is described by a multivariate normal distribution, the conditional distribution can be easily derived by GADP. For non-normal distributions, a copula-based GADP may be more suitable for approximating the true joint distribution.

Once the data have been optimally masked, bias is eliminated and security of the confidential data is maximised. However, as described above, there is often reluctance on the part of the user to accept analyses based on "artificial" data such as masked data. Accordingly, the present invention provides a method for shuffling data already masked as described above to allow use of the actual confidential attributes, but without risk that a snooper may be able to ascertain any more information about the confidential attributes than when the masked data is used. Further, the user must be able to analyse the data as desired, and achieve a statistically identical result as if the original, non-masked data had been used.

The next step (Step 32) is to sort the entire masked data set comprising S and Y (or Y* which is the normalized masked confidential attribute) by variable $Y_j$. Next, in Step 34 only the original confidential attribute $X_j$ is sorted by the identical method as the sorting of the masked dataset. and to repeat this step. The sorted values of $Y_j$ are then (Step 36) replaced by the sorted values of $X_j$, i.e. the $j^{th}$ rank ordered value of $Y_j$ is replaced with the $j^{th}$ rank ordered value of $X_j$. This step is repeated for every observation (Step 38). While in a presently preferred embodiment GADP is used to generate conditional values of X|S for a normally distributed dataset, and copula-based GADP is used to generate conditional values for datasets not having a normal distribution, it must be emphasized that any conventional method of data masking is suited to the method of the present invention, and that the data shuffling steps (Steps 32–38) may be performed on any perturbed data set regardless of the methodology used to generate the perturbed values.

Other aspects of the present invention will become apparent to those skilled in this art from the following description wherein there is shown and described a preferred embodiment of this invention, simply by way of illustration of one of the modes best suited to carry out the invention. As it will be realized, this invention is capable of other different embodiments and its several details are capable of modification in various, obvious aspects all without departing from the intended scope of the invention. Accordingly, the descriptions and examples herein will be regarded as illustrative in nature and not as restrictive.

EXAMPLE 1

A dataset was selected where all attributes therein were numerical, with a multivariate normal distribution. The database consisted of 25,000 records and three attributes. All 3 attributes were required to be masked prior to release, i.e. the dataset included no non-confidential attributes. Accordingly, all that was required was to generate an independent set of 25,000 observations from a multivariate normal distribution with the same parameters as the original data. Next, for each confidential attribute the ordered values of $Y_i$ were replaced by ordered values of $X_i$. For comparison, a rank-based proximity swap was performed. Two different swaps were generated, one using $R_0=0.95$ and another using $R_0=0.80$. As described by Moore (1996, Controlled Data Swapping Techniques for Masking Public Use Microdata Files, *Census Bureau Research Report Series RR96-04*, incorporated herein by reference), specification of a large value for $R_0$ results in a higher level of accuracy, but also a lower level of security because the swapped and alternative values are closer to one another. Table 1 shows a sample data set of 25 observations comparing the original values, the rank-based proximity swap values, and the values shuffled according to the present invention.

TABLE 1

A Segment of the Example Data Set

| Record # | Original | | | RBP Swap (R0 = 0.95) | | | RBP Swap (R0 = 0.80) | | | Shuffled | | |
|---|---|---|---|---|---|---|---|---|---|---|---|---|
| | X1 | X2 | X3 | X1 | X2 | X3 | X1 | X2 | X3 | X1 | X2 | X3 |
| 1 | −0.0525 | 0.0629 | 0.1710 | −0.0126 | 0.0697 | 0.0807 | −0.2171 | 0.0103 | 0.0951 | −0.2422 | 0.5295 | 0.0540 |
| 2 | −0.6309 | −0.2740 | 0.1883 | −0.6742 | −0.2838 | 0.1893 | −0.4116 | −0.1249 | 0.2918 | 0.7064 | 0.5966 | −0.1360 |
| 3 | −0.0017 | 0.0164 | 1.4277 | −0.0482 | 0.1112 | 1.2018 | 0.0552 | 0.0212 | 2.0835 | 2.3315 | 0.5961 | 0.7167 |
| 4 | −1.3398 | −0.8500 | −0.0972 | −1.1640 | −0.9231 | −0.0357 | −1.2684 | −0.9059 | −0.2039 | −0.4781 | −0.6905 | 0.9984 |
| 5 | −0.0143 | 1.6700 | 1.0685 | 0.0198 | 1.5625 | 1.2168 | 0.0265 | 1.3610 | 1.3758 | 1.0070 | 0.4516 | 2.3669 |
| 6 | −2.1372 | −0.8513 | −1.4010 | −2.0030 | −1.0074 | −1.5085 | −1.5725 | −1.0453 | −1.9284 | 0.3548 | 0.7806 | −0.1701 |
| 7 | 0.0736 | 0.2067 | −1.4423 | 0.0948 | 0.2494 | −1.4110 | 0.1625 | 0.2399 | −1.4898 | 0.3073 | 0.1742 | −0.6544 |
| 8 | 1.0245 | −0.7113 | 0.2176 | 1.0724 | −0.6459 | 0.1728 | 1.0865 | −0.6630 | 0.1944 | −0.7379 | −1.3728 | −0.7570 |
| 9 | −0.0550 | −1.1462 | −0.1139 | −0.0457 | −1.2303 | −0.1331 | −0.2033 | −0.9101 | −0.2090 | 0.5915 | 1.1196 | 1.0916 |
| 10 | 0.6892 | 0.5282 | 0.1669 | 0.5804 | 0.5210 | 0.2432 | 0.8495 | 0.3258 | 0.0111 | 1.5127 | 0.5066 | 0.4968 |
| 11 | −0.6988 | −0.8284 | −1.6296 | −0.6789 | −0.7409 | −1.9595 | −0.9477 | −0.9560 | −1.9554 | 1.1911 | 1.8057 | −0.2559 |
| 12 | 0.9604 | 0.2387 | 0.7705 | 1.0391 | 0.2514 | 0.7471 | 0.7308 | 0.1611 | 0.6513 | 1.3448 | 1.5861 | 1.5991 |
| 13 | −0.5558 | 0.3790 | −0.7950 | −0.4468 | 0.3328 | −0.7946 | −0.3563 | 0.3869 | −0.6024 | −0.0032 | 1.0836 | −0.7146 |
| 14 | −1.2627 | 0.0628 | 0.4789 | −1.4673 | 0.1174 | 0.4522 | −0.9659 | −0.0333 | 0.7029 | 2.0202 | 1.4507 | 3.4092 |
| 15 | 1.0248 | 1.9856 | 0.9875 | 1.0404 | 1.7619 | 0.8487 | 1.1486 | 2.3167 | 1.1020 | 1.5973 | 2.1194 | 0.4278 |

TABLE 1-continued

A Segment of the Example Data Set

| | Original | | | RBP Swap (R0 = 0.95) | | | RBP Swap (R0 = 0.80) | | | Shuffled | | |
|---|---|---|---|---|---|---|---|---|---|---|---|---|
| Record # | X1 | X2 | X3 | X1 | X2 | X3 | X1 | X2 | X3 | X1 | X2 | X3 |
| 16 | 0.5675 | −1.4232 | −0.1790 | 0.5987 | −1.4835 | −0.0936 | 0.7537 | −2.6922 | −0.3374 | −1.9808 | −1.7838 | −1.0618 |
| 17 | −0.3643 | −1.0657 | 1.1428 | −0.4682 | −1.0967 | 1.1481 | −0.3649 | −0.9837 | 1.0657 | 0.1370 | 1.7100 | 1.6618 |
| 18 | −0.6378 | 0.4170 | −1.4451 | −0.5777 | 0.4484 | −1.3866 | −0.8384 | 0.4745 | −1.7875 | −0.2633 | 2.6689 | 0.5275 |
| 19 | −2.0000 | −1.0527 | −0.9359 | −2.0957 | −1.2319 | −0.8513 | −1.2658 | −1.0405 | −0.8780 | −1.7313 | −0.1554 | 0.6613 |
| 20 | −0.0354 | 0.4417 | 0.1950 | −0.1071 | 0.4034 | 0.2779 | −0.1021 | 0.6496 | 0.0733 | 0.1176 | 1.0110 | 0.5409 |
| 21 | 0.1122 | −1.1207 | −0.6715 | 0.1022 | −1.1023 | −0.6256 | 0.1362 | −1.0917 | −0.7664 | 0.1071 | 0.1600 | −0.4089 |
| 22 | 0.8468 | −0.6959 | −1.1102 | 0.9772 | −0.6539 | −1.0833 | 0.9338 | −0.4906 | −0.8566 | −0.2591 | 0.7927 | 0.9194 |
| 23 | −0.2494 | 0.9370 | 0.0553 | −0.2402 | 0.8033 | 0.0103 | −0.1392 | 1.1621 | 0.2150 | −0.0733 | 0.0682 | −0.4237 |
| 24 | −0.3239 | −0.3231 | 0.8132 | −0.4199 | −0.2697 | 0.9450 | −0.3241 | −0.1980 | 0.9859 | −1.1347 | −0.2697 | −0.4875 |
| 25 | −0.6725 | 0.4266 | 0.1569 | −0.6423 | 0.4107 | 0.1068 | −0.5740 | 0.4154 | 0.0409 | 2.4557 | 1.0913 | 0.9900 |

Table 2 shows the correlation matrix of the original variables, the swapped variables, and the shuffled variables. In comparison with the swapped variables, the correlation of the shuffled variables closely mirrored the original correlation matrix. Only minor differences were observed between the original and shuffled correlation matrices, mainly due to sampling error. The marginal distributions of the individual attributes were the same before and after shuffling, and the correlation matrix of the shuffled attributes were the same as the original attributes.

TABLE 2

Correlation Matrix of the Original and Masked Attributes

| | Original | | | RBP Swap ($R_0$ = 0.95) | | | RBP Swap ($R_0$ = 0.80) | | | Shuffled | | |
|---|---|---|---|---|---|---|---|---|---|---|---|---|
| | Attribute 1 | Attribute 2 | Attribute 3 | Attribute 1 | Attribute 2 | Attribute 3 | Attribute 1 | Attribute 2 | Attribute 3 | Attribute 1 | Attribute 2 | Attribute 3 |
| Attribute 1 | 1.0000 | | | 1.000 | | | 1.000 | | | 1.000 | | |
| Attribute 2 | 0.4946 | 1.0000 | | 0.4783 | 1.0000 | | 0.4560 | 1.0000 | | 0.5001 | 1.0000 | |
| Attribute 3 | 0.4022 | 0.6032 | 1.0000 | 0.3915 | 0.5827 | 1.0000 | 0.3670 | 0.5561 | 1.0000 | 0.3984 | 0.5954 | 1.0000 |

To evaluate security of the shuffled data, a regression analysis was performed to predict the values of the confidential attribute X1, using the masked values. For rank-based proximity swap, results indicated that a snooper would be able to predict 96.6% of the variability in X1 using the released information. As shown in Table 3, a rough 95% confidence interval estimate of the true value of the confidential attribute for the shuffled data approached 0. The regression analysis also indicated that the shuffled values provided a potential snooper with no information regarding the confidential attributes.

TABLE 3

Results of Regression Analysis to Predict Original Attribute 1 using Masked Values

| | RBP Swap ($R_0$ = 0.95) | RBP Swap ($R_0$ = 0.80) | Shuffled |
|---|---|---|---|
| Intercept | 0.000 | 0.000 | −0.003 |
| Coefficient of Masked Attribute 1 | 0.971 | 0.930 | 0.005 |

TABLE 3-continued

Results of Regression Analysis to Predict Original Attribute 1 using Masked Values

| | RBP Swap ($R_0$ = 0.95) | RBP Swap ($R_0$ = 0.80) | Shuffled |
|---|---|---|---|
| Coefficient of Masked Attribute 2 | 0.020 | 0.038 | 0.001 |
| Coefficient of Masked Attribute 3 | 0.005 | 0.022 | −0.005 |
| R2 | 0.966 | 0.916 | 0.000 |
| Standard Error | 0.185 | 0.290 | 1.000 |

A correlation between the original and masked data is shown in Table 4. The rank-based proximity swap values correlated well with the original data attributes. In contrast, there was practically no correlation between the original and shuffled attributes, evidencing the security provided by the method of this invention. Table 5 provides the rank-order correlation between the original and masked values. As with product moment correlation, the rank order correlation between the original and shuffled values are near zero.

TABLE 4

Correlation Between the Original and Masked Attributes

| | RBP Swap ($R_0 = 0.95$) | | | RBP Swap ($R_0 = 0.80$) | | | Shuffled | | |
|---|---|---|---|---|---|---|---|---|---|
| | Masked Attribute 1 | Masked Attribute 2 | Masked Attribute 3 | Masked Attribute 1 | Masked Attribute 2 | Masked Attribute 3 | Masked Attribute 1 | Masked Attribute 2 | Masked Attribute 3 |
| Original Attribute 1 | 0.9825 | 0.4870 | 0.3967 | 0.9558 | 0.4744 | 0.3844 | 0.0034 | 0.0001 | −0.0027 |
| Original Attribute 2 | 0.4850 | 0.9827 | 0.5928 | 0.4729 | 0.9580 | 0.5778 | 0.0002 | −0.0146 | −0.0112 |
| Original Attribute 3 | 0.3961 | 0.5906 | 0.9827 | 0.3832 | 0.5770 | 0.9580 | 0.0004 | −0.0116 | −0.0064 |

TABLE 5

Rank Order Correlation Between the Original and Masked Attributes

| | RBP Swap ($R_0 = 0.95$) | | | RBP Swap ($R_0 = 0.80$) | | | Shuffled | | |
|---|---|---|---|---|---|---|---|---|---|
| | Masked Attribute 1 | Masked Attribute 2 | Masked Attribute 3 | Masked Attribute 1 | Masked Attribute 2 | Masked Attribute 3 | Masked Attribute 1 | Masked Attribute 2 | Masked Attribute 3 |
| Original Attribute 1 | 0.9963 | 0.4738 | 0.3866 | 0.9855 | 0.4681 | 0.3792 | 0.0045 | −0.0024 | −0.0058 |
| Original Attribute 2 | 0.4738 | 0.9965 | 0.5798 | 0.4681 | 0.9862 | 0.5732 | 0.0019 | −0.0168 | −0.0111 |
| Original Attribute 3 | 0.3859 | 0.5793 | 0.9964 | 0.3798 | 0.5727 | 0.9860 | 0.0023 | −0.0114 | −0.0045 |

EXAMPLE 2

Figure 2:
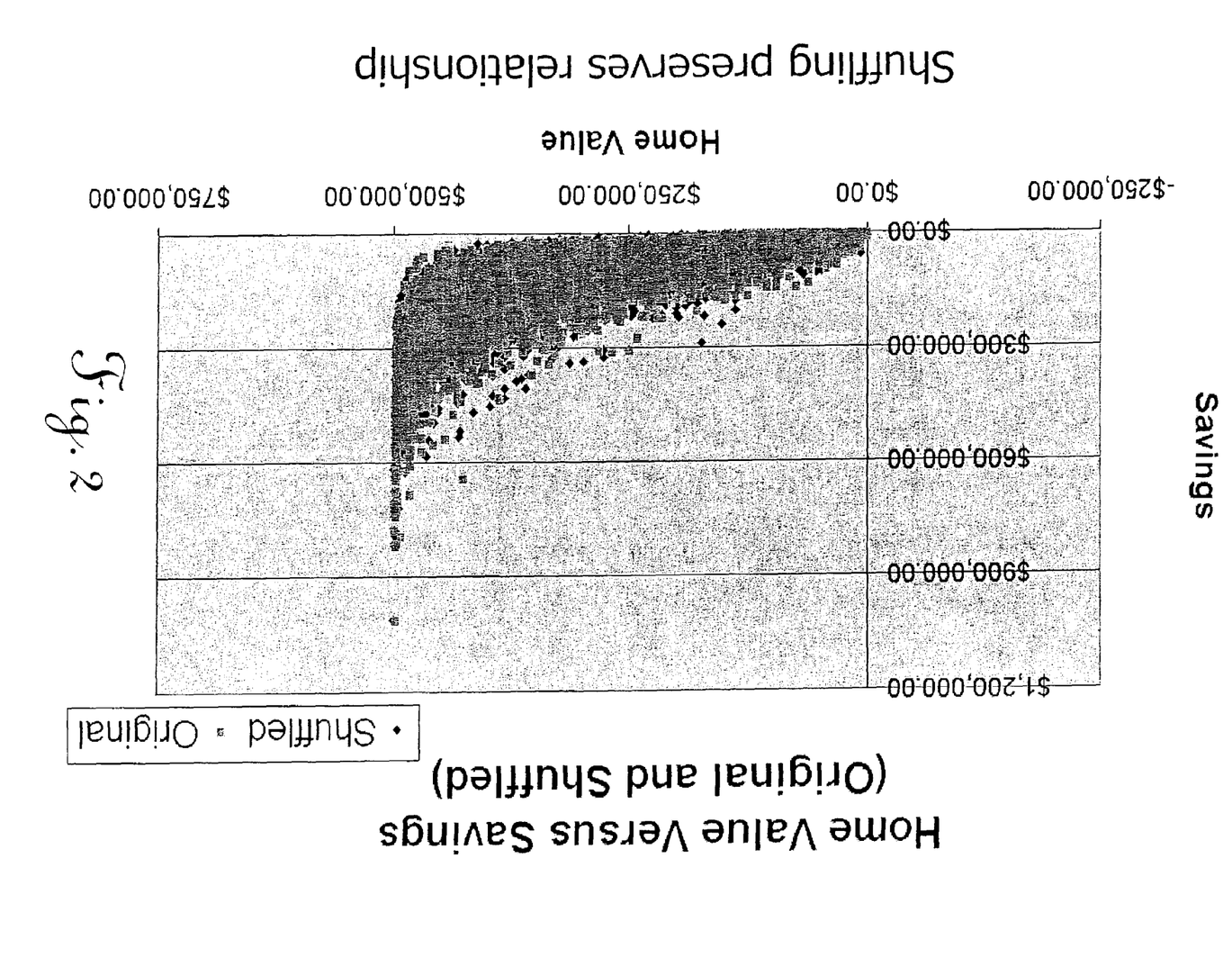
FIG. 2 graphically compares the utility of age group versus savings data for original data and data shuffled by the method of the present invention.
Figure 3:
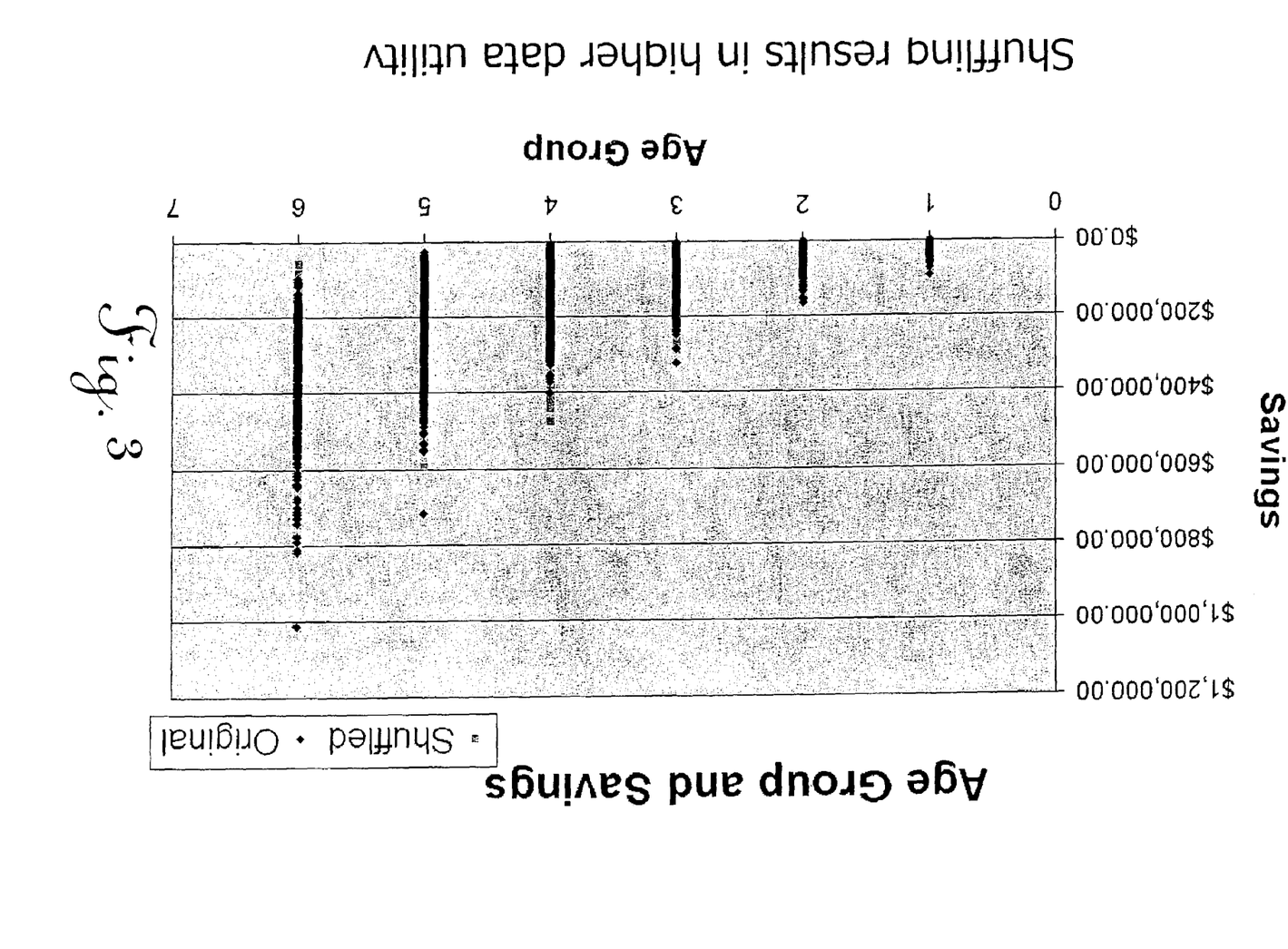
FIG. 3 graphically depicts the relationship between home value and savings using original data and data shuffled by the method of the present invention.

A dataset of 10,000 observations, including the variables of Gender (males coded as 0, females coded as 1), Marital Status (married coded as 0, others coded as 1), age (input as a discrete variable consisting of integer values from 1 to 6 in increasing order of age), Value of Home (top coded at 500,000), and Savings was considered. The last two numerical variables (Value of Home and Savings) were required to be maintained in confidentiality. As shown in FIG. 2, the data shuffling method of the present invention resulted in increased data utility, as well as preserving the relationship between the variables, for example the relationship between Value of Home and Savings for original and shuffled data (FIG. 3).

Of course, the objective of data masking is to provide users with access to data that can be analyzed to provide results that are very close to the analysis by a simulated user attempting to predict Savings based on Gender, Marital Status, Age Group, and Value of Home. The data shuffling procedure of the present invention was compared to a known prior additive noise technique as well as to rank-based proximity swapping. As shown in Table 6, for each variable evaluated, the method of the present invention resulted in values resembling the original values, and consistently outperformed the swapping and additive noise techniques. Regression analysis using data shuffled by the method of the present invention closely resembled the original data in all respects. In contrast, swapped and noise added data provide results that differ considerably from the original data.

TABLE 6

RESULTS OF REGRESSION ANALYSIS TO PREDICT SAVINGS USING OTHER VARIABLES

| MEASURE | ORIGINAL | SHUFFLED | ADDITIVE | SWAPPED |
|---|---|---|---|---|
| $R^2$ | 72% | 72% | 65% | 67% |
| STANDARD ERROR | 53083 | 52864 | 71899 | 57506 |
| COEFFICIENTS | | | | |
| INTERCEPT | −93071 | −93338 | −94798 | −78240 |
| GENDER | −3229 | −5744 | 10858 | −21212 |
| MARITAL STATUS | 37919 | 35964 | 39534 | 20540 |
| AGE GROUP | 34496 | 35427 | 23920 | 32570 |
| VALUE OF HOME | 0.2896 | 0.2825 | 0.4211 | 0.2865 |

EXAMPLE 3

In another aspect of the present invention, computer executable instructions as part of computer readable media may be used to accomplish the method of the present invention. When described in the context of computer readable media having computer executable instructions stored thereon, it is denoted that the instructions include program modules, routines, programs, objects, components, data structures, and patterns that perform particular tasks or implement particular abstract data upon or within various structures of the computing environment. Executable instructions exemplarily comprise instructions and data which cause a general purpose computer, special purpose computer, or special purpose processing device to perform a certain function or group of functions. A copy of the source code coding for the computer executable instructions embodying a presently preferred embodiment of the present invention is appended hereto as a Code Appendix, and is incorporated herein by reference.

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for ensuring confidentiality of variables in a dataset having at least one confidential attribute or variable, comprising:

separating the dataset into at least one non-masked confidential attribute and at least one non-confidential attribute;

normalizing the dataset into a multivariate normal distribution;

calculating a masked confidential attribute comprising a normalized perturbed value for the confidential attribute derived from a conditional distribution of the confidential and non-confidential attribute; and creating a masked dataset comprising the masked confidential attribute wherein a relationship of the masked confidential attribute to the non-confidential attribute is substantially the same as the relationship of the non-confidential attribute to the confidential attribute from which the masked confidential attribute was derived; and sorting the masked dataset by a predetermined parameter; and independently sorting the unmasked confidential attribute by the predetermined parameter; and replacing the stored masked confidential attribute in the sorted masked dataset with the sorted non-masked confidential attribute.

2. The method of claim 1, wherein each of the confidential and non-confidential attribute is selected from the group consisting of numerical and categorical attributes, and any combination thereof.

3. The method of claim 1, wherein the normalized conditional distribution of the confidential and non-confidential attribute is calculated as:

$$f(X^*|S^*)$$

where $X^*$ is the normalized confidential attribute, $S^*$ is the normalized non-confidential attribute, and f is the marginal density of $X^*$ and $S^*$.

4. The method of claim 1, wherein the dataset has a non-normal distribution, and the dataset is normalized by transforming into a multivariate normal distribution using copula-based general additive data perturbation (GADP) prior to deriving the conditional distribution of the confidential and non-confidential attribute.

5. The method of claim 1, wherein the dataset has a normal distribution, and the dataset is normalized by transforming into a multivariate normal distribution using GADP prior to deriving the conditional distribution of the confidential and non-confidential attribute.

6. The method of claim 1, wherein the normalized perturbed value of the confidential attribute $y_i$ is calculated as:

$$f(X^*|S^*=s_i)$$

where $y_i$ is the normalized perturbed confidential attribute, $X^*$ is the normalized confidential attribute, $S^*$ is the normalized non-confidential attribute, f is the marginal density of $X^*$ and $S^*$, and $s_i$ is the value of the non-confidential attribute for the $i^{th}$ observation.

7. The method of claim 1, wherein the masked dataset and unmasked confidential attribute are sorted by rank order.

8. The method of claim 7, wherein the masked dataset and unmasked confidential attribute are sorted in ascending order.

9. The method of claim 7, wherein the masked dataset and unmasked confidential attribute are sorted in descending order.

10. A computer-readable medium having computer-executable instructions for ensuring confidentiality of attributes or variables in a dataset having at least one confidential attribute or variable, by the steps of:

(a) separating the dataset into at least one non-masked confidential attribute and at least one non-confidential attribute;

(b) normalizing the dataset into a multivariate normal distribution;

(c) calculating a masked confidential attribute comprising a normalized perturbed value for the confidential attribute derived from a conditional distribution of the confidential and non-confidential attribute;

(d) creating a masked dataset comprising the masked confidential attribute, wherein a relationship of the masked confidential attribute to the non-confidential attribute is substantially the same as the relationship of the non-confidential attribute to the confidential attribute from which the masked confidential attribute was derived;

(e) sorting the masked dataset by a predetermined parameter;

(f) independently sorting the unmasked confidential attribute by the predetermined parameter; and (g) replacing the sorted masked confidential attribute in the sorted masked dataset with the sorted non-masked confidential attribute.

11. The computer-readable medium of claim 10, wherein each of the confidential and non-confidential attribute is selected from the group consisting of numerical and categorical attributes, and any combination thereof.

12. The computer-readable medium of claim 10, wherein the computer-readable medium calculates the normalized conditional distribution of the confidential and non-confidential attribute as:

$$f(x^*|S^*)$$

where $X^*$ is the normalized confidential attribute, $S^*$ is the normalized non-confidential attribute, and f is the marginal density of $X^*$ and $S^*$.

13. The computer-readable medium of claim 10, wherein the dataset has a non-normal distribution, and the computer-readable medium normalizes the dataset by transforming into a multivariate normal distribution using copula-based general additive data perturbation (GADP) prior to deriving the conditional distribution of the confidential and non-confidential attribute.

14. The computer-readable medium of claim 10, wherein the dataset has a normal distribution, and the computer-readable medium normalizes the dataset by transforming into a multivariate normal distribution using GADP prior to deriving the conditional distribution of the confidential and non-confidential attribute.

15. The computer-readable medium of claim 10, wherein the computer-readable medium calculates the normalized perturbed value of the confidential attribute $y_i$ as:

$$f(X^*|S^*=s_i)$$

where $y_i$ is the normalized perturbed confidential attribute, X is the normalized confidential attribute, S is the normalized non-confidential attribute, f is the marginal density of X* and S*, and $s_i$ is the value of the non-confidential attribute for the $i^{th}$ observation.

16. The computer-readable medium of claim 10, wherein the software sorts the masked dataset and unmasked confidential attribute by rank order.

17. The computer-readable medium of claim 16, wherein the computer-readable medium sorts the masked dataset and unmasked confidential attribute in ascending order.

18. The computer-readable medium of claim 16, wherein the computer-readable medium sorts the masked dataset and unmasked confidential attribute in descending order.

19. A method for ensuring confidentiality of variables in a dataset having at least one confidential variable and at least one non-confidential variable, comprising:

selecting a masking procedure;

masking the at least one confidential variable in the dataset to create a second dataset including the masked confidential variable, wherein the masked confidential variable comprises a normalized perturbed value for the confidential variable derived from a conditional distribution of the confidential and non-confidential variable and wherein a relationship of the masked confidential variable to the non-confidential variable is substantially the same as the relationship of the non-confidential variable to the confidential variable from which the masked confidential variable was derived;

rank ordering the second dataset;

rank ordering the confidential variable using the same criteria as the rank ordering of the second dataset; and replacing the rank-ordered masked confidential variable in the second dataset with the rank-ordered confidential variable.

20. The method of claim 19, wherein the second dataset and confidential variable are rank-ordered in ascending order.

21. The method of claim 19, wherein the second dataset and confidential variable are rank-ordered in descending order.

* * * * *